Patented May 6, 1941

2,240,744

UNITED STATES PATENT OFFICE 2,240,744

UNDERWATER COMPOUND

John B. Arpin, Fort Lauderdale, Fla., assignor to Beach Erosion Control Company, Miami Beach, Fla., a corporation of Florida No Drawing. Application July 16, 1937, Serial No. 153,942

6 Claims. (Cl. 106—35)

The invention relates to a compound adapted for use in underwater work as a mortar or concrete, and particularly the latter, in which case it is mixed with an aggregate of suitable character such as sand and rock.

In the building of underwater structures conditions are encountered which do not exist in ordinary construction work. A primary difficulty is the washing action of the water. To meet this it is necessary that the fresh mortar or concrete be sufficiently resistant to such washing action as to prevent any substantial amount of disintegration during the period of time required for it to attain a set capable of withstanding fully the erosion of the water.

I have found that an intimate mixture of Portland cement and ordinary fire clay associated in certain proportions noted hereinafter possesses characteristics rendering it exceptionally well adapted for the purpose. It has the additional marked advantage of being economical, since it is readily obtainable in many localities and in view of its relatively low cost the large quantities in which it is used for the purpose specified introduces no difficulty. Further advantages and characteristics will be noted hereinafter in the more detailed description, or will be apparent from a consideration of the invention as a whole.

The invention accordingly comprises a composition of matter possessing the characteristics, properties and the relation of constituents which will be exemplified in the composition hereinafter described and the scope of the application of which will be indicated in the claims.

In producing my compound the proportions of the ingredients will vary somewhat dependent upon the characteristics or properties most desired for the particular use under consideration. In general, increased proportions of fire clay relative to the Portland cement will result in increased stickiness and resistance to erosion under the action of water waves. Too great a proportion of fire clay, however, will reduce the ultimate tensile and compressive strength to an undesired degree. It has been found in this regard that strength is roughly directly proportional to the percentage of cement employed.

Through numerous experiments I have found that for practical purposes it is necessary for the fire clay to be kept within the range of about 30% to 60% by weight and the Portland cement correspondingly within the range of 70% to 40%. The above percentages refer, of course, to the compound or mortar exclusive of any other ingredients such as the aggregate employed in underwater concrete work. As a specific example, an excellent mixture for general purposes may comprise 45% of fire clay and 55% Portland cement. In such proportions the strength when completely set is very good and sufficient for practically all purposes of normal underwater construction. When initially immersed in the water it possesses a stickiness sufficient to withstand any wave action or water currents to which it would normally be subjected without substantial erosion. Such a mixture loses its stickiness after about three hours but will maintain its bond and in twenty-four hours will have set to a degree of resisting fully all wave wash short of the most extreme.

A mixture of the above character and within the range of proportions noted has been found to possess properties of adhesion and cohesion to a high degree, both as between the particles of the compound itself and with respect to aggregates and also steel and like materials with which a mortar or concrete is normally associated.

Despite the fact that the fresh mortar or concrete as thoroughly mixed with water possesses a stickiness to such a degree, the operation of mixing can be performed in an ordinary concrete mixer without balling up. The mortar can be made stiff enough to stand up on a quite moderate slope without slumping, and accordingly enables its use in many cases without the necessity of resorting to retaining forms. The compound is useful as a construction material per se, or mixed with aggregate as a concrete, or as a mortar between stones or pre-cast blocks, for example.

In the use of my underwater compound in a concrete the amount and character of the aggregate will depend largely upon the conditions of use and the aggregate available. I have found, however, that a highly satisfactory concrete for general purposes may be made in the following proportions, referring in this case to volume: 1 ordinary size sack of Portland cement comprising 1 portion; 2½ portions of sand; 3 portions of rock and 1 portion of fire clay. In the preparation, the cement, fire clay and sand should be thoroughly mixed dry, and then the water added, and thereafter the rock.

If desired a small amount of ordinary sodium bicarbonate may be added to hasten somewhat the setting. In the above example 8 ounces is sufficient for this purpose.

An admixture containing a slightly less proportion of fire clay has been successfully used comprising in this case the use of 30 lbs. of fire clay in a concrete mixture containing 100 lbs. of cement.

Since certain changes may be made in the above product and different embodiments of the invention could be made without departing from its scope, it is intended that all matter contained in the above description shall be interpreted as illustrative and not in a limiting sense.

Having described my invention, what I claim as new and desire to secure by Letters Patent is:

1. An underwater cementitious compound capable of use in an exposed manner under water, comprising an intimate mixture of sand, cement and fire clay, said ingredients being present in the proportions by volume of cement 20 to 35% of the whole, fire clay 20 to 35%, and sand in an amount not greater than three times the quantity of fire clay.

2. An underwater cementitious compound capable of use in an exposed manner under water, comprising an intimate mixture of sand, cement and fire clay present in the proportions of the whole by volume of cement 20 to 35%, fire clay 20 to 35% and a substantial amount of sand but less than 60% of the whole.

3. An underwater cementitious compound resistant to water erosion while setting, comprising an intimate mixture of sand, cement and fire clay, the fire clay and cement being present in the ratio of not less than 3 parts fire clay to 7 parts cement and not more than 5 parts fire clay to 5 parts cement, and the sand being present in substantial amount but less than 60% of the whole, the above proportions being by volume.

4. An underwater cementitious compound capable of use in an exposed manner under water without substantial erosion during setting, comprising an intimate mixture of the specified ingredients in about the following proportions by volume, 4 parts sand, 3 parts cement, and 2 parts fire clay.

5. An underwater cementitious compound capable of use in an exposed manner under water, comprising an intimate mixture of sand, cement and fire clay, the fire clay being present in the amount of about 30% and the sand and cement in a ratio to each other of about 1 to 3.

6. A concrete mixture for use under water, comprising cement and fire clay together with an aggregate of sand and rock, the fire clay and cement being present in the ratio by volume of not less than 3 parts fire clay to 7 parts cement and not more than 5 parts fire clay to five parts cement, the sand being present in substantial amount but not exceeding in volume the combined volumes of the fire clay and cement.

JOHN B. ARPIN.